Feb. 23, 1965   B. B. MATHIAS ETAL   3,171,033
INSPECTING RIMS OF GLASS CONTAINERS FOR CRIZZLE
AND LINE-OVER-FINISH DEFECTS
Filed Aug. 8, 1961   2 Sheets-Sheet 1
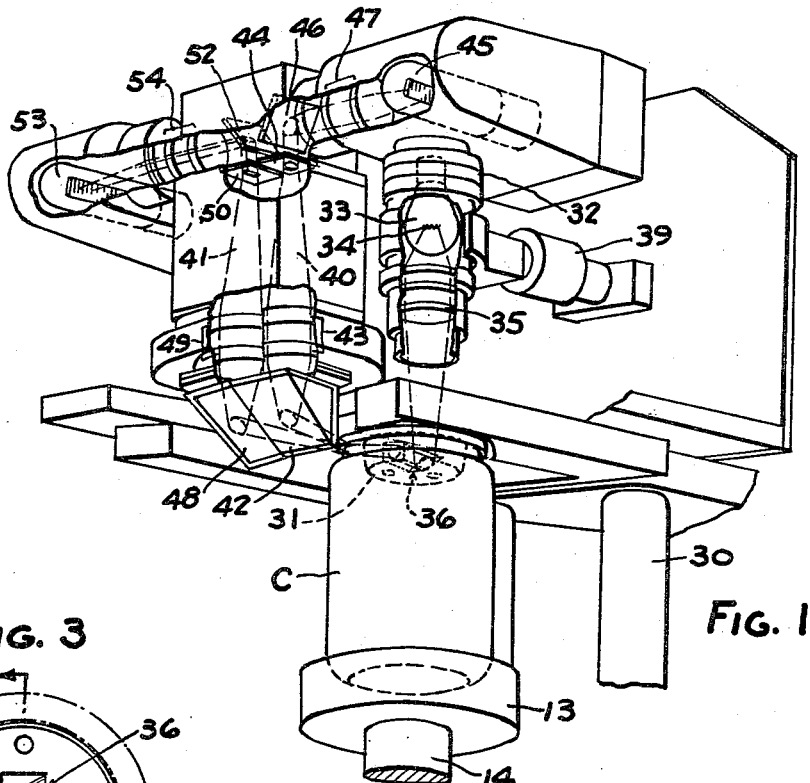
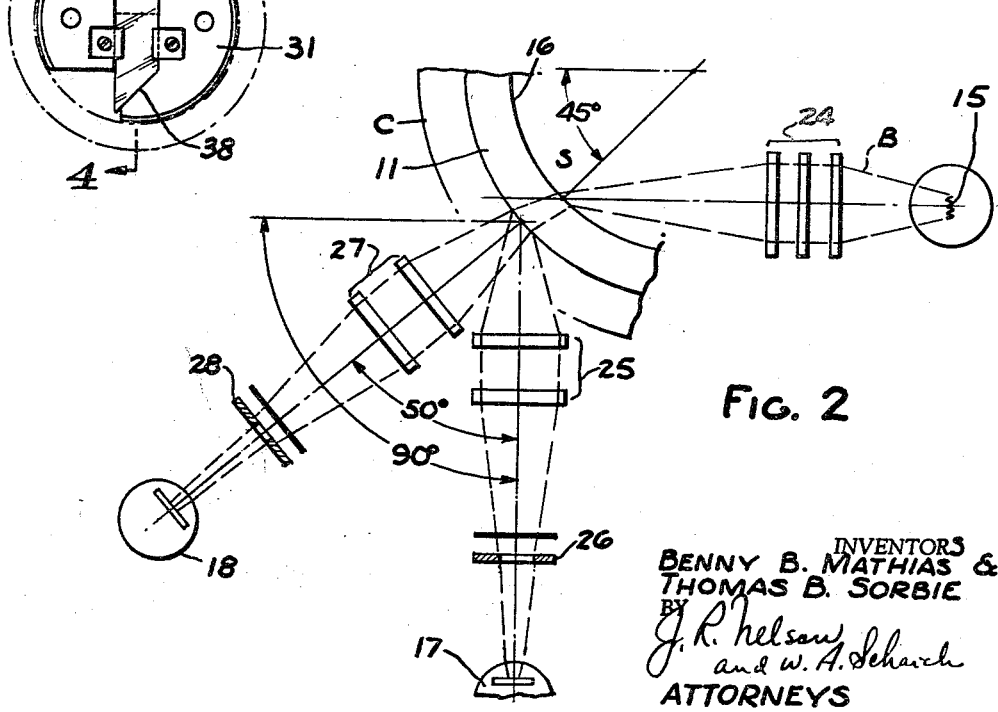
INVENTORS
BENNY B. MATHIAS &
THOMAS B. SORBIE
BY
ATTORNEYS Feb. 23, 1965  B. B. MATHIAS ETAL  3,171,033
INSPECTING RIMS OF GLASS CONTAINERS FOR CRIZZLE
AND LINE-OVER-FINISH DEFECTS
Filed Aug. 8, 1961  2 Sheets-Sheet 2

INVENTORS
BENNY B. MATHIAS &
THOMAS B. SORBIE
BY
ATTORNEYS

United States Patent Office 3,171,033
Patented Feb. 23, 1965

3,171,033
INSPECTING RIMS OF GLASS CONTAINERS FOR CRIZZLE AND LINE-OVER-FINISH DEFECTS
Benny B. Mathias and Thomas B. Sorbie, Toledo, Ohio, assignors to Owens-Illinois Glass Company, a corporation of Ohio
Filed Aug. 8, 1961, Ser. No. 130,174
3 Claims. (Cl. 250—224)

This invention relates to inspecting the rims of open mouth glass containers and particularly to the inspecting of the rims of said containers to detect the presence of crizzle and line-over-finish defects.

In glass containers and similar containers having an open mouth to which a closure is applied for sealing the container, defects known as crizzle and line-over-finish defects, when present, interfere with the sealing of the closure and form points of incipient leakage. Crizzles are mirror-like cracks that lie in a vertical plane extending generally radially of the container. Line-over-finish defects are cylindrical voids which extend generally axially of the container either in the rim wall or on the surface of the rim wall. Both crizzle and line-over-finish defects result from a manner of production of the glass containers and, of course, containers containing such defects should be rejected.

It is therefore an object of this invention to provide a method and apparatus for quickly and easily inspecting the rims of open mouth glass containers and the like for crizzle and line-over-finish defects; to provide such a method and apparatus wherein the container is inspected for both said defects simultaneously; and to provide such a method and apparatus which is fast and dependable.

According to the invention, a beam of radiant energy which can be transmitted through the material of the container is focused in a spot on the interior wall of the rim of the container at an acute angle to a radial plane. The container is rotated about its axis relative to the spot so that the spot successively scans portions of the rim of the container. A crizzle defect will cause a portion of the beam to be reflected by the mirror-like surface of the crizzle defect while a line-over-finish defect will cause a portion of the beam to be refracted and reflected. A first element sensitive to the radiant energy of the beam is positioned with its line of vision forming an angle of 75 degrees to 105 degrees with the direction of the beam toward the rim so that the sensitive element will become energized by the passage of a crizzle defect into the path of the spot of the beam. A second sensitive element is positioned with its line of vision forming an angle of 125 to 175 degrees with the direction of the beam toward the rim so that a line-over-finish defect passing into the path of the spot of the beam will be detected. Means are provided in the line of vision of each sensitive element for focusing the portion of the beam directed to the element in a plane adjacent the element and the field of vision of each sensitive element is restricted to the area of the container being illuminated. When the signal is created by either of the sensitive elements, it is amplified and caused to actuate a reject or signal mechanism.

In the drawings:

FIG. 1 is a part sectional elevation of an apparatus embodying the invention.

FIG. 2 is a diagrammatic plan view showing the relationship of the various operating parts of the invention.

FIG. 3 is a plan view of a portion of the apparatus shown in FIG. 1.

Figure 5:
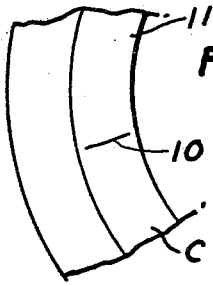
FIG. 5 is a plan view of a portion of the rim of a glass container showing a crizzle defect.
Figure 6:
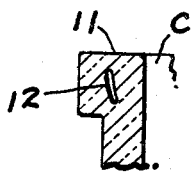
FIG. 6 is a vertical section through the rim of a glass container showing a line-over-finish defect.

Referring to FIGS. 5 and 6, a crizzle defect 10 constitutes a mirror-like crack or surface usually within the confines of the rim 11 of the container and extending along a radial plane of the container. A line-over-finish defect 12 is in the form of a generally cylindrical void in the rim 11 formed by a blister which has been elongated in a direction generally parallel to the axis of the container. The defect 12 may be entirely within the confines of the rim 11, on the surface thereof or extending also onto the upper edge of the rim 11.

As shown in FIG. 1, the apparatus embodying the invention comprises a support 13 onto which a container C is adapted to be mounted. The support is adapted to be rotated through drive shaft 14 so that the container is rotated about its axis. The container C includes an open mouth or upper end defined by the rim 11 and is herein shown as being generally cylindrical.

Referring to FIG. 2, as the container C is rotated on pad 13, a beam of radiant energy from a source 15 is directed against the rim 11 of the container. As shown in FIG. 2, which is a diagrammatic plan view of the container and the relationship of the various parts, the light beam B is directed at an acute angle to a radial plane, preferably 45 degrees, and is focused against the interior wall 16 of the rim of the container in a spot S. As the container C is rotated relative to the spot S, the spot scans the rim 11 of the container. If a crizzle defect extending in a radial plane enters the path of the beam B, it reflects a portion of the beam, because of its mirror-like surface, at an angle, which is 90 degrees to the direction of the beam if the acute angle of the beam is 45 degrees. A first element 17 sensitive to the radiant energy of the beam, such as a photocell or a photomultiplier, is positioned with its line of vision in the path of the portion of the beam reflected by a crizzle defect. This angle is preferably 90 degrees but may vary within reasonable limits, for example, between 75 degrees and 105 degrees.

Figure 8:
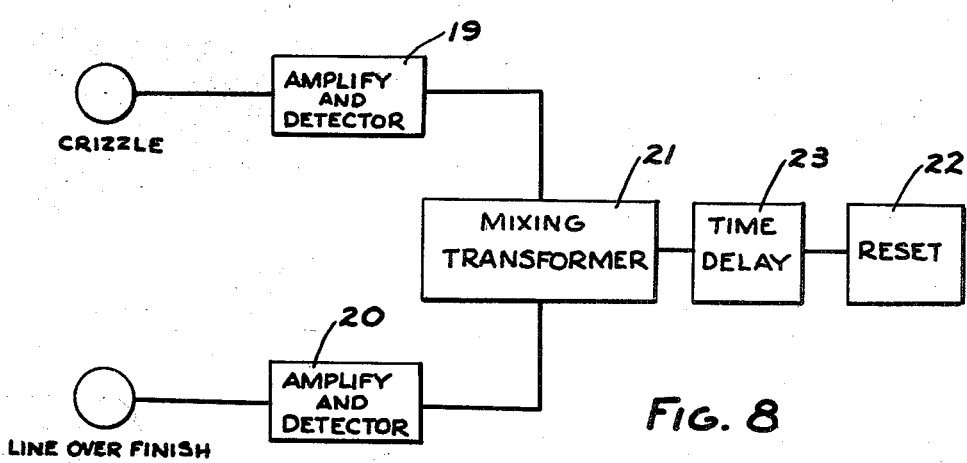
FIG. 8 is a block diagram of the electrical circuit used with the apparatus.

When a line-over-finish defect enters the path of the beam B, it does not merely reflect light, but, on the contrary, refracts and reflects light. The major portion of this refracted and reflected light forms an angle of 125 to 175 degrees with the direction of the beam B toward the rim 11. A second element 18 sensitive to the radiant energy of the beam is positioned with its line of vision lying within the angle of 125 to 175 degrees with the direction of the beam so that it will be energized when the line-over-finish defect enters the beam. As shown in FIG. 8, a defect energizing either of the light sensitive elements is amplified through combined amplifiers and detectors 19, 20 and passes to a mixing transformer 21 which, in turn, energizes a reject mechanism 22. If desired, a time delay 23 can be provided so that the rejection can occur at a subsequent station other than the inspecting station. Alternatively, a signal mechanism can be energized instead of a reject mechanism.

The beam is preferably focused on the interior wall surface 16 of the container by lenses 24. In addition, the portion of the beam reflected by a crizzle defect is preferably focused by lenses 25 on an aperture of a mask 26 adjacent the first sensitive element 17. Similarly, the portion of the beam reflected by a line-over-finish defect is focused by lenses 27 on an aperture of a mask 28 adjacent the second sensitive element 18. The masks 26, 28 thus restrict the field of vision of the sensitive elements 17, 18 to the area of the container being scanned by the spot S so that the sensitive elements 17, 18 are less likely to be actuated by stray signals from other sources of radiant energy.

Figure 4:
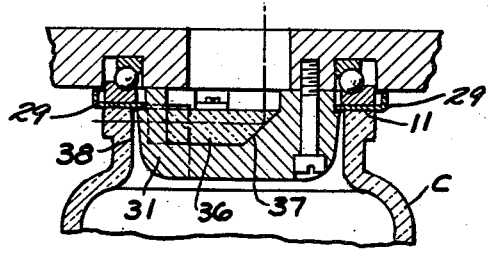
FIG. 4 is a sectional view taken along the line 4—4 in FIG. 3.
Figure 7:
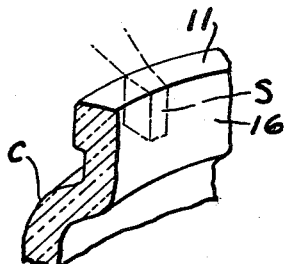
FIG. 7 is a fragmentary perspective view of the rim of a container which is being inspected.

The specific apparatus shown in FIG. 1 comprises a support 13 on which the container C is positioned for rotation about its axis and a frame 30 on which the various parts of the apparatus are supported. The support 13 is adapted to be elevated after a container C is placed thereon bringing the rim 11 into contact with a rotatable head 29. A cone 31 on frame 30 extends within the open mouth of the container. A source 32 of radiant energy including an incandescent bulb 33 is positioned above the container C. The bulb 33 has a rectangular filament 34 that emits a beam of radiation downwardly. The beam is focused by lenses 35 downwardly against a prism 36, mounted in the cone 31. As shown in FIGS. 3 and 4, prism 36 includes reflecting faces 37, 38 that reflect the beam so that it is focused into a rectangular spot S on the interior wall 16 of the container (FIG. 7). The bulb 33 is preferably oriented so that the filament directs a beam in such a manner that the rectangular spot S extends vertically or parallel to the axis of the container. Light source 32 is adjustably mounted on the frame 30 by a universal connection 39.

Pick-up assemblies 40, 41 are positioned exteriorly of the container C for picking up the portions of the beam which are redirected by defects. Pick-up assembly 40 constitutes a prism 42 that is positioned in such a manner that it will pick up the portion of the beam reflected by a crizzle defect, that is, with its axis at an angle of 90 degrees with the direction of the beam toward the rim of the container. This angle, as set forth above, may range between 75 and 105 degrees. The beam picked up by prism 42 is directed upwardly through lenses 43 and focused into an aperture of a mask 44. A sensitive element 45 is positioned to view the mask, the field of vision of the light sensitive element 45 being restricted by the mask. Because of space limitations, sensitive element 45 is positioned at one side and a mirror 46 reflects the spot focused into the aperture of mask 44 and passes it through condensing lenses 47 to the sensitive element 45. By this arrangement, the line of vision of the sensitive element 45 is at an angle of 90 degrees with the direction of the beam toward the rim of the container so that a crizzle defect moving into the path of the spot formed by the beam on the rim of the container will reflect light into the field of vision of the sensitive element 45.

Pick-up assembly 41 is similar to assembly 40 and comprises a pick-up prism 48 which has its line of vision forming an angle ranging between 125 and 175 degrees with the direction of the beam toward the rim of the container. Prism 48 redirects the portion of the beam, refracted and reflected by a line-over-finish defect moving into the path of the spot, upwardly through lenses 49 which focus it into an aperture of a mask 50. Sensitive element 61 is positioned so that it will be energized by illumination of the opening in the mask 50. For purposes of convenience and space limitations, sensitive element 61 is positioned at one side and a mirror 52 reflects the beam through condensing lenses 54 onto the element 51. Thus, the line of vision of the sensitive element 61 forms an angle ranging between 125 and 175 degrees with the line of vision of the beam so that a line-over-finish defect moving into the path of the spot S of the beam will cause a portion of the beam to be refracted and reflected to the sensitive element 61.

In operation, a container C is placed on the pad 13 and the pad is moved upwardly bringing the rim 11 into engagement with the rotatable head 29 and guided by cone 31. The pad 13 is then rotated to cause the spot S of light which is focused against the rim of the container at an acute angle to a radial plane to scan the rim of the container. If a crizzle defect is present, it will cause a portion of the beam to be reflected at substantially 90 degrees toward the pick-up prism 42 which, in turn, will reflect the beam upwardly through condensing lenses 43 which focus it into the aperture of mask 44. The portion of the beam will pass through the aperture in the mask 44 and be reflected by mirror 46 through condensing lenses 47 onto the sensitive element 45. If a line-over-finish defect moves into the path of the spot S, a portion of the beam will be refracted and reflected. Pick-up prism 48 will pick up this portion of the beam and reflect it upwardly through lenses 49 which focus it onto the mask 50. The beam will pass into the aperture in the mask and be reflected by mirror 52 through condensing lenses 54 onto the sensitive element 53. In the event that either of the sensitive elements 45 or 53 are energized, then the signal will be amplified and cause the reject mechanism or other signaling device to be energized.

It can thus be seen that there has been provided a method and apparatus for simultaneously inspecting a container for crizzle defects and line-over-finish defects. The inspection is achieved by signal apparatus at a single station with the use of a single source of radiant energy.

We claim:

1. An apparatus for inspecting the rim of an open mouth container made of translucent material for crizzle and line-over-finish defects comprising a support for the container, a source of radiant energy mounted adjacent the container, means for focusing a beam of radiation from said source and directing the beam against the interior wall surface of the rim of the container at an acute angle to a radial plane to produce a spot of radiant energy on the rim of the container, means for rotating said container relative to said spot about the axis of the container to cause said spot to scan the rim of the container, a first element sensitive to said radiation mounted adjacent said container with its line of vision extending through the outer wall surface of the rim of the container and forming an angle ranging from 75 degrees to 105 degrees with the path of the beam toward the rim of the container so that a crizzle defect moving into the spot causes a reflection of a portion of the beam toward said first element, means for restricting the field of vision of said first sensitive element to the area of the rim onto which the spot of radiant energy is focused, a second element sensitive to said radiation positioned adjacent the container with its line of vision extending through the outer wall surface of the rim of the container and forming an angle ranging from 125 degrees to 175 degrees with the path of the beam toward the rim of the container so that a line-over-finish defect moving into the area of the spot causes a portion of the beam to be refracted and reflected toward said second sensitive element, and means for restricting the field of vision of the second sensitive element to the area of the rim of the container into which the spot of radiant energy is focused.

2. An apparatus for inspecting the rim of an open mouth container made of translucent material for crizzle and line-over-finish defects comprising a support for the container, a source of radiant energy mounted adjacent the container, means for focusing a beam of radiation from said source and directing the beam against the interior wall surface of the rim of the container at an acute angle to a radial plane to produce a spot of radiant energy on the rim of the container, means for rotating said container relative to said spot about the axis of the container to cause said spot to scan the rim of the container, a first element sensitive to said radiation mounted adjacent said container with its line of vision extending through the outer wall surface of the rim of the container and forming an angle ranging from 75 degrees to 105 degrees with the path of the beam toward the rim of the container so that a crizzle defect moving into the spot causes a reflection of a portion of the beam toward said first element, means in the path of said first element for focusing said portion of the beam reflected by a crizzle defect in a plane adjacent said first sensitive element, means for restricting the field of vision of said first sensitive element to the area of the rim onto which the spot of radiant energy is focused, a second element sensitive to said radiation positioned adjacent the container with its line of vision extending through the outer wall surface of the rim of the container and forming an angle ranging from 125 degrees to 175 degrees with the path of the beam toward the rim of the container so that a line-over-finish defect moving into the area of the spot causes a portion of the beam to be refracted and reflected toward said second sensitive element, means in the path of said second sensitive element for focusing the portion of the beam refracted and reflected by a line-over-finish defect adjacent said second sensitive element and means for restricting the field of vision of the second sensitive element to the area of the rim of the container into which the spot of radiant energy is focused.

3. An apparatus for inspecting the rim of an open mouth container made of translucent material for crizzle and line-over-finish detects comprising a support for the container, a source of radiant energy mounted adjacent the container, means for focusing a beam of radiation from said source and directing the beam against the interior wall surface of the rim of the container at an acute angle to a radial plane to produce a rectangular spot of radiant energy on the rim of the container, the spot having a greater dimension in a direction parallel to the axis of the container, means for rotating said container relative to said spot about the axis of the container to cause said spot to scan the rim of the container, a first element sensitive to said radiation mounted adjacent said container with its line of vision extending through the outer wall surface of the rim of the container and forming an angle ranging from 75 degrees to 105 degrees with the path of the beam toward the rim of container so that a crizzle defect moving into the spot causes a reflection of a portion of the beam toward said first element, means in the path of said first element for focusing said portion of the beam reflected by a crizzle defect in a plane adjacent said first sensitive element, means for restricting the field of vision of said first sensitive element to the area of the rim onto which the rectangular spot of radiant energy is focused, a second element sensitive to said radiation adjacent the container with its line of vision extending through the outer wall surface of the rim of the container and forming an angle ranging from 125 degrees to 175 degrees with the path of the beam toward the rim of the container so that a line-over-finish defect moving into the area of the spot causes a portion of the beam to be refracted and reflected toward said second sensitive element, means in the path of said second sensitive element for focusing the portion of the beam refracted and reflected by a line-over-finish defect adjacent said second sensitive element and means for restricting the field of vision of the second sensitive element to the area of the rim of the container into which the rectangular spot of radiant energy is focused.

References Cited in the file of this patent

UNITED STATES PATENTS

| | | |
|---|---|---|
| 2,481,863 | Owens | Sept. 13, 1949 |
| 2,531,529 | Price | Nov. 28, 1950 |
| 2,593,127 | Fedorchak | Apr. 15, 1952 |
| 2,868,061 | Fedorchak et al. | Jan. 13, 1959 |
| 3,027,798 | Mathias | Apr. 3, 1962 |
| 3,107,011 | Mathias et al. | Oct. 15, 1963 |